United States Patent [19]

Healy

[11] 4,226,392
[45] Oct. 7, 1980

[54] THREE DIMENSIONAL FINE FOCUS DETECTOR MOUNT

[75] Inventor: Roberto W. Healy, Los Angeles, Calif.

[73] Assignee: General Dynamics Corporation Pomona Division, Pomona, Calif.

[21] Appl. No.: 912,788

[22] Filed: Jun. 5, 1978

[51] Int. Cl.³ .......................................... F16M 11/04
[52] U.S. Cl. .................................................... 248/178
[58] Field of Search ............... 248/178, 179, 287, 419, 248/124; 269/59, 60

[56] References Cited

U.S. PATENT DOCUMENTS

| | | | |
|---|---|---|---|
| 1,397,453 | 11/1921 | Rekar | 248/124 X |
| 2,518,685 | 8/1950 | Harrison | 74/424.8 B X |
| 2,608,909 | 9/1952 | Quinn | 269/60 X |
| 2,617,092 | 11/1952 | Schlawin | 74/424.8 B X |
| 2,693,736 | 11/1954 | Schumacher | 74/424.8 B X |
| 2,893,130 | 7/1959 | Ierokomos | 74/424.8 B X |
| 3,046,006 | 7/1962 | Kulicke | 269/60 |
| 3,124,018 | 3/1964 | Gough | 269/60 |
| 3,510,219 | 5/1970 | Liva | 350/245 |
| 3,525,140 | 8/1970 | Cachon et al. | 269/60 |
| 3,575,486 | 4/1971 | De Posada | 350/90 |
| 3,576,135 | 4/1971 | Tschunko | 74/89.15 |
| 3,727,471 | 4/1973 | Botos | 74/89.15 |
| 3,740,048 | 6/1973 | Lassy | 269/59 |
| 3,751,139 | 8/1973 | Malherbe | 350/252 |
| 3,917,385 | 11/1975 | Caswell | 350/252 |
| 3,954,338 | 5/1976 | Hennel | 356/153 |
| 4,031,629 | 6/1977 | Paluck | 33/290 |
| 4,041,795 | 8/1977 | Rekoff | 74/424.8 B |
| 4,138,082 | 2/1979 | Fatemi | 248/419 |

FOREIGN PATENT DOCUMENTS 436394 12/1974 U.S.S.R. .................................. 248/178

Primary Examiner—William H. Schultz
Attorney, Agent, or Firm—Neil F. Martin; Freling E. Baker; Edward B. Johnson

[57] ABSTRACT

A three axis fine focus mounting for supporting an optical component which must be positioned at a precise focal point. The mounting is adjustable along three orthogonal axes, each controlled by an adjustment screw having dual threads of unequal pitch. Provision is also made for angular or rotational adjustment about one axis and each adjustable element can be locked at any set position.

12 Claims, 5 Drawing Figures

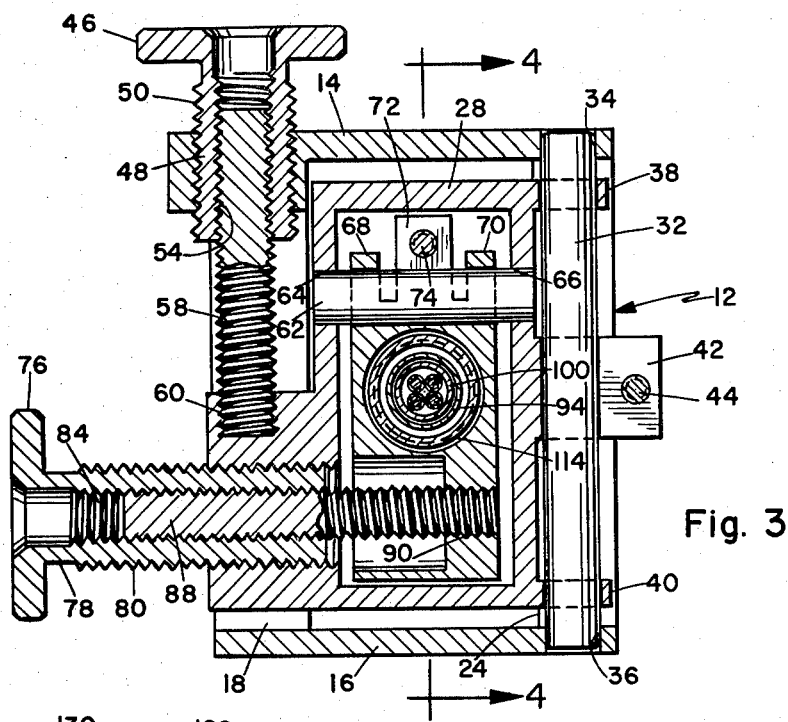
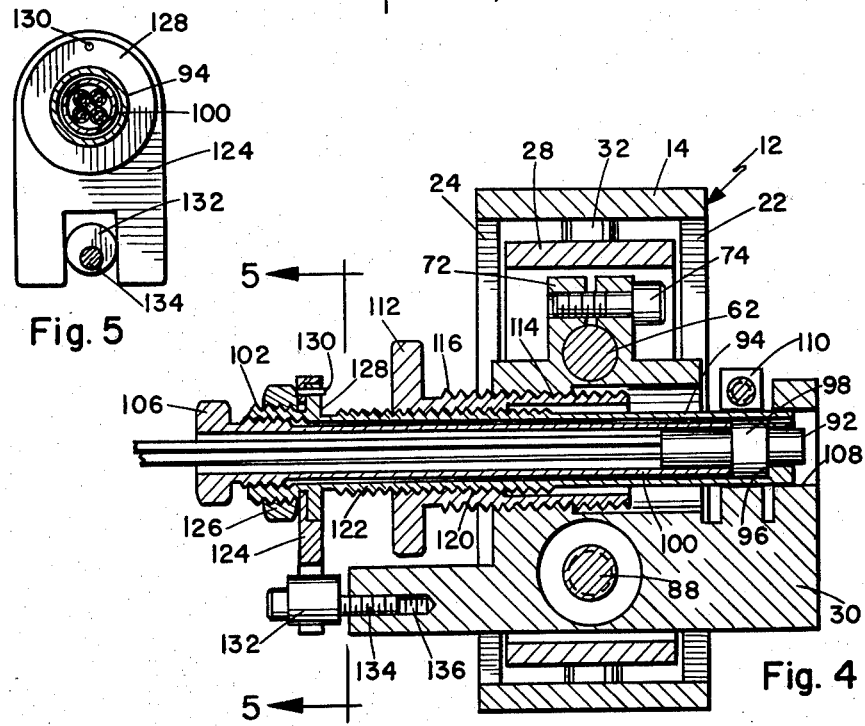

THREE DIMENSIONAL FINE FOCUS DETECTOR MOUNT

The government has rights in this invention pursuant to Contract DAAK 10-77-C-2012, awarded by the Department of the Army.

BACKGROUND OF THE INVENTION

The present invention relates to adjustable mounting devices and pertains particularly to a three dimensional fine focus mounting assembly.

The adjustment of most optical systems depends on the steadiness of a technician's hands, or at best a single fine threaded screw thread which is too coarse for fine focus requirements. Most such devices depend on high machining accuracy and the inconvenience of shimming for controlling adjustment and focus. Where adjustment capability is available, it is usually provided along the optical axis only. Some optical systems, such as avalanche detectors for example, require fine linear adjustment in three orthogonal directions, since the detector quadrants must be accurately aligned with respect to the vertical, horizontal and line-of-sight axes. Angular adjustment about the line-of-sight is also required.

It is therefore desirable that an adjustable mounting system or apparatus be available which eliminates the hit-and-miss focus techniques of most available systems.

SUMMARY AND OBJECTS OF THE INVENTION

It is the primary object of the present invention to overcome the above problems of the prior art.

Another object of the present invention is to provide a mount for detectors and the like that have the capability of adjustment in three orthogonal directions.

A further object of the present invention is to provide a mounting device for fine focus adjustment in three directions, as well as angular adjustments around at least one axis of adjustment.

In accordance with the primary aspect of the present invention, a mounting system for focusing the element includes adjustng means for movement in three orthogonal directions relative to a base support member, plus angular adjusting means for movement of the focusing element in at least one of these directions.

BRIEF DESCRIPTION OF THE DRAWINGS

The above and other objects and advantages of the present invention will become apparent from the following description when read in conjunction with the drawings, wherein:

FIG. 3 is a sectional view taken on line 3—3 of FIG. 2.

FIG. 4 is a sectional view taken on line 4—4 of FIG. 3.

FIG. 5 is a sectional view taken on line 5—5 of FIG. 4.

DETAILED DESCRIPTION OF A PREFERRED EMBODIMENT

Figure 1:
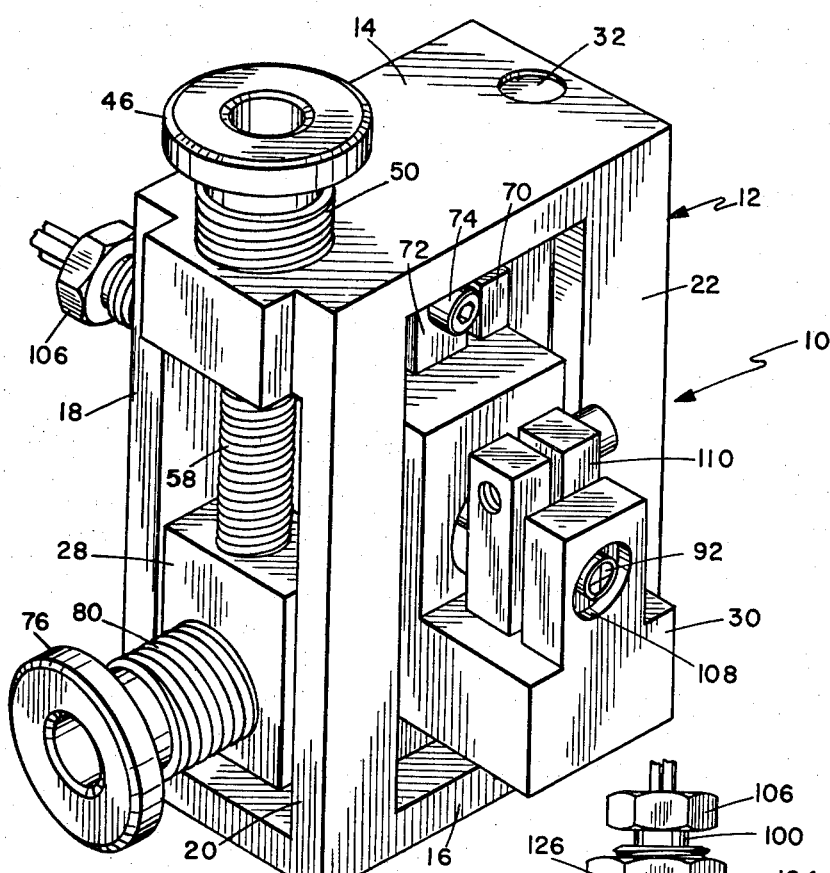
FIG. 1 is a perspective view of the mounting assembly.
Figure 2:
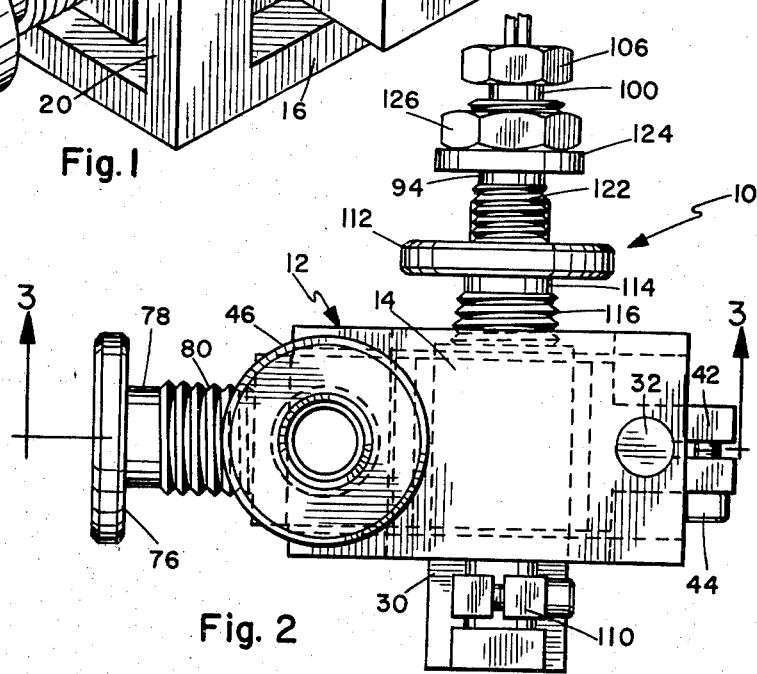
FIG. 2 is a top plan view of the mounting.

Turning to the drawings, particularly FIG. 1, there is illustrated a three dimensional fine focus detector mount in accordance with the present invention, designated generally by the numeral 10. This mount comprises a base support or housing assembly 12 of a generally open sided box configuration having a top generally rectangular wall 14 and a bottom generally rectangular wall 16, supported in spaced relationship by means of a plurality of vertically extending posts 18, 20, 22 and 24. This provides a generally open sided box configuration for supporting the adjusting assembly.

The housing arrangement provides for the convenient mounting of a vertical adjustment block assembly 28 adjustably mounted within the base housing member 12 and a horizontally adjustment block assembly 30 adjustably mounted within the vertical adjustment block assembly.

The vertical adjustment block 28 is of a generally box-like configuration having two opposite sides open through which the components or portions of the horizontal adjustment block assembly 30 extend. The vertical block assembly 28 is slidably mounted on a vertical substantially cylindrical guide pin 32 which is press fitted in bore 36 in the bottom 16 and closely slip-fitted in bore 34 in the top 14 of the support housing. The vertical block assembly 28 includes a pair of slide brackets 38 and 40 slidably mounted on the guide pin 32. An adjustment locking clamp 42 includes a pair of opposed clamping members extending around the guide pin 32 and pulled together into clamping engagement therewith by means of a clamping screw 44.

A differential vertical adjusting assembly for adjusting the block or carriage assembly 28 vertically along the guide pin 32 comprises a vertical adjustment screw 46 having a threaded sleeve portion thereof 48 having outer threads 50 in threaded engagement within a threaded bore in the top of the support housing 14. The sleeve 48 also includes inner threads 54 which are in cooperative engagement with a threaded stud or screw 58 which is threadably engaged and fixed at its lower end in a bore 60 within a portion of the vertical block assembly 28. The outer threads 50 and the inner threads 54 are of a different pitch and extend in a direction such that rotation of the screw 46 causes the stud 58 and the screw member 46 to move in opposite axial directions, thus movement of one is subtracted from the movement of the other, providing a very find adjustment which consists of the difference between the threads or pitch of the threads 50 and 54. Thus, a fine differential adjustment along the axis of screw 58 and along the guide pin 32 is provided. The clamp 42 is of course released when it is desired to move the block or slide assembly 28 along the pin 32 and is reclamped to the pin when an adjustment position is obtained.

The horizontal adjustment block assembly 30 is slidably mounted within the open center of the vertical block assembly 28. The horizontal adjustment slide block assembly 30 is slidably mounted on a horizontal pin 62 which is press fitted into bore 66 and closely slip-fitted into bore 64 in the side walls of the vertical block assembly 28. A pair of slide brackets 68 and 70 slidably support the block assembly 30 on the pin 32. A horizontal clamp assembly 72 functions by means of a screw 74 to clamp the block assembly 30 to the guide pin 62. The horizontal adjustment block assembly 30 is adjusted along the pin 62 by means of a horizontal adjustment screw 76, which includes a threaded sleeve portion 78 having outer threads 80 engaging a threaded bore in the side wall of the vertical block assembly 28. The sleeve also includes inner threads 84 which threadably engage a screw 88 which is threadably secured and fixed at its inner end in a bore 90 in the horizontal adjustment block assembly 30. This differential adjusting assembly is similar to the vertical adjusting assembly wherein the outer threads 80 have a different pitch from inner threads 84, such that rotation of the screw 76 results in the screw 76 and inner screw 88 moving in opposite directions. Thus, the movement of the block 30 is equal to the difference between the pitch of the inner and outer threads of the screw 76.

A focusing element 92 in the form of a lens, a transmitter, or a receiver is mounted for axial movement or adjustment as well as rotational adjustment about its axis. The focusing element 92 is mounted within a mounting tube 94 having an annular shoulder 96 defined at the end thereof for engagement by a radial flange 98 of the focusing element 92. A clamping tube 100 extends into the mounting sleeve 94 and engages the opposite side of the focusing element flange 98 maintaining it in the mounting sleeve 94. The clamping tube includes outer threads 102 which thread into the outer end of the mounting tube. A hex nut 106 on the outer end of the mounting sleeve permits rotation thereof relative to the mounting sleeve 94. The mounting sleeve 94 is slidably mounted within a bore 108 in the horizontal adjusting block 30. A focusing adjustment clamp 110 clamps about the focusing sleeve 94 for securing it into position.

A focusing adjustment screw 112 having a threaded sleeve portion 114 with outer threads 116 engaging a threaded bore within the horizontal mounting block or adjustment block 30. The sleeve 114 includes inner threads 120 which engage outer threads 122 on the outside of the mounting sleeve 94. The outer threads 116 and the inner threads 120 are of a different pitch and move the respective adjusted element at a distance proportional to a difference in the pitch of the threads. Thus, a very fine adjustment of the focusing element 92 along its focusing axis is obtained. An angular adjusting yoke 124 seats on a radially extending flange 128 on the sleeve 94 and is pinned thereto by means of a connecting pin 130 and secured by a lock nut 126. Thus, rotation of the angular adjusting yoke or fork 124 rotates the mounting sleeve 94 about its line-of-sight axis. Rotation of the sleeve 94 and the focusing element 92 about its axis is accomplished by means of a cam 132 which is mounted on a screw 134 into a bore 136 within the horizontal adjusting block 30. Rotation of the screw 134, and thus cam 132, cams the fork or yoke 124 about the axis of the mounting sleeve 94 and rotates the mounting sleeve about that axis.

From the above description it is seen that I have a novel three dimensional fine focus detector mount assembly having differential adjusting means for mounting and adjusting an element about three orthogonal axes.

While I have illustrated and described the invention by means of a single embodiment, it is to be understood that numerous changes and modifications may be made therein without departing from the spirit and scope of the invention as defined in the appended claims.

Having described my invention, I now claim:

1. A three dimensional focusing mount comprising:
a housing of generally open sided box construction,
movable mounting means including a vertical adjusting block slidably mounted for vertical movement on guide means within said housing,
a horizontal adjusting block slidably mounted in said vertical adjusting block for horizontal movement relative thereto,
adjusting means for adjusting said mounting means in three directions relative to the base member, said adjusting means including first differential adjusting means for movement of said vertical adjusting block along a vertical path relative to said base member, and second differential adjusting means for movement of said horizontal adjusting block along a first horizontal path relative to said vertical adjusting block;
a mounting sleeve for mounting a focusing element adjustably mounted on said horizontal adjusting block for movement along a second horizontal path, said second horizontal path being at a right angle to said first horizontal path, and
angular adjusting means for angular adjustment of said mounting sleeve about an axis extending along said second horizontal path.

2. The focusing mount of claim 1, wherein said differential adjusting means comprises a threaded sleeve having inner and outer threads for each of the three directions.

3. The focusing mount of claim 2, wherein said three directions are orthogonal.

4. The focusing mount of claim 1, wherein said guide means comprises a vertical guide pin, and
clamping means carried by said vertical adjusting block for clamping to said pin.

5. A three dimensional focusing mount comprising:
a housing of generally open sided box construction,
movable mounting means including a vertical adjusting block slidably mounted for vertical movement on guide means within said housing,
a horizontal adjusting block slidably mounted in said vertical adjusting block for horizontal movement relative thereto, for mounting a focusing element,
adjusting means for adjusting said mounting means in three directions relative to the base member, said adjusting means including first differential adjusting means for movement of said vertical adjusting block along a vertical path relative to said base member, and second differential adjusting means for movement of said horizontal adjusting block along a first horizontal path relative to said vertical adjusting block;
a mounting clamp adjustably mounted on said horizontal adjusting block for movement along a second horizontal path, said second horizontal path being at a right angle to said first horizontal path, said mounting clamp comprising,
a mounting tube having a first clamping shoulder, and
a clamping sleeve mounted within said mounting tube and including a second clamping shoulder for movement toward and away from said first clamping shoulder; and
angular adjusting means for angular movement of said mounting clamp about an axis extending along said second horizontal path.

6. The focusing mount of claim 5, wherein said clamping sleeve threadably engages said mounting tube for clamping movement thereof during relative movement therebetween.

7. The focusing mount of claim 5, wherein said mounting tube is slidably mounted within a bore in said horizontal mounting block, and
said adjusting means includes a differential adjusting screw threadably engaging said mounting tube and said bore in said block by means of inner and outer threads respectively, said inner and outer threads having a different pitch for differential movement of said mounting tube upon rotation of said adjusting screw.

8. The focusing mount of claim 7, wherein said angular adjusting means comprises a cam rotatably mounted on said horizontal adjusting block and a follower arm secured to said mounting tube and engaging said cam so that rotation of said adjusting screw moves said clamping sleeve along its axis.

9. The focusing mount of claim 8, including clamping means for clamping said mounting sleeve into selected positions relative to said adjusting block.

10. The focusing mount of claim 5, wherein said first differential adjusting means comprises an adjusting screw having inner and outer threads of a different pitch, said outer threads engaging a threaded bore in said housing and said inner threads engaging a threaded stud fixed to said vertical adjusting block.

11. The focusing mount of claim 5, wherein said second differential adjusting means comprises a differential adjusting screw, said screw having inner and outer threads of a different pitch, said outer threads engaging a threaded bore in said vertical adjusting block and said inner threads engaging threads on a stud fixed to said horizontal adjusting block.

12. The focusing mount of claim 11, wherein said horizontal adjusting block is slidably mounted on a guide pin fixed to said vertical adjusting block, and clamping means for clamping said horizontal adjusting block in selected fixed positions relative to said vertical adjusting block.

* * * * *